(12) United States Patent
Sacripante et al.

(10) Patent No.: US 6,299,941 B1
(45) Date of Patent: Oct. 9, 2001

(54) PROCESS OF PAINTING WITH INKS WITH COLORED RESIN EMULSION PARTICLES

(75) Inventors: Guerino G. Sacripante, Oakville (CA); Garland J. Nichols, Ontario, NY (US); Min-Hong Fu, Webster, NY (US); Chieh-Min Cheng, Rochester, NY (US); Daniel G. Marsh, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/706,953

(22) Filed: Nov. 6, 2000

Related U.S. Application Data

(62) Division of application No. 08/903,700, filed on Jul. 31, 1997, now Pat. No. 6,251,987.

(51) Int. Cl.$^7$ ...................................................... B05D 5/00
(52) U.S. Cl. ................................................................ 427/288
(58) Field of Search ............................................... 427/288

(56) References Cited

U.S. PATENT DOCUMENTS 6,156,384 * 2/2000 Hutter et al. .......................... 427/288

\* cited by examiner

*Primary Examiner*—Christopher Henderson
(74) *Attorney, Agent, or Firm*—E. O. Palazzo

(57) ABSTRACT

An aqueous ink jet ink composition comprised of water, colorant, and colored resin emulsion particles generated from olefinic monomers, wherein at least one of said olefinic monomers contains a colorant, wherein the olefinic colorant component is prepared from the condensation reaction of a functional colorant with an olefinic containing reactive material, and which reaction generates

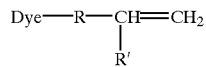

wherein Dye represents a colorant chromophore, and R is a carbonyl, carboxylate, oxygen, or arylene, and R' is hydrogen or alkyl.

19 Claims, No Drawings

US 6,299,941 B1

PROCESS OF PAINTING WITH INKS WITH COLORED RESIN EMULSION PARTICLES

This application is a divisional of application Ser. No. 08/903,700, filed Jul. 31, 1997 now U.S. Pat. No. 6,251,987.

BACKGROUND OF THE INVENTION

The use of resin emulsion particles in pigmented inks is illustrated in copending application U.S. Ser. No. 08/869,962, the disclosure of which is wholly incorporated herein by reference, which discloses, for example, a resin emulsion comprised of from about 40 to 60 weight percent of benzyl methacrylate, from about 5 to about 20 weight percent of methacrylic acid, and from about 20 to about 40 percent by weight of polyethyleneglycol methacrylate, or more generally, a low molecular weight polyethylene glycol capped with a methacrylate or acrylate group.

The present invention is generally directed to ink compositions. More specifically, the present invention is directed to aqueous ink compositions particularly suitable for use in ink jet printing processes, and especially thermal ink jet processes, wherein the inks enable images with excellent smear resistant characteristics, and which inks contain unsaturated dye molecules incorporated into the resin emulsion particle by emulsion polymerization. Moreover, with the inks of the present invention the optical density of the developed images is excellent, paper curl is minimized and image smearing is minimal, or avoided. In embodiments, the present invention relates to imaging processes with ink jet inks comprised of water, colorant, especially dye, or pigment, and resin emulsion particles. Further, images developed with the inks of the present invention in embodiments enable ink jet prints of excellent resolution, acceptable and improved optical density, excellent waterfastness, minimum or very low showthrough, and excellent MFLEN.

PRIOR ART

Ink jet printing can be considered a non-impact method that generates droplets of ink that are deposited on a substrate, such as paper or transparent film, in response to an electronic digital signal.

In existing thermal ink jet printing, the printhead typically comprises one or more ink jet ejectors, such as disclosed in U.S. Pat. No. 4,463,359, the disclosure of which is totally incorporated herein by reference, each ejector including a channel communicating with an ink supply chamber, or manifold, at one end and having an opening at the opposite end, referred to as a nozzle. A thermal energy generator, usually a resistor, is located in each of the channels, a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. This is a temporary phenomenon, and the ink is quickly propelled toward a print sheet. As the bubble begins to collapse, the ink still in the channel between the nozzle and bubble starts to move toward the collapsing bubble, causing a volumetric contraction of the ink at the nozzle and resulting in the separation from the nozzle of the bulging ink as a droplet. The feed of additional ink provides the momentum and velocity for propelling the droplet toward a print sheet, such as a piece of paper. Since the droplet of ink is emitted only when the resistor is actuated, this type of thermal ink jet printing is known as "drop-on-demand" printing. Other types of ink jet printing, such as continuous-stream or acoustic, are also known.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some types of apparatus, a relatively small printhead moves across a print sheet numerous times in swathes, much like a typewriter. Alternatively, a printhead which consists of an array of ejectors and extends the full width of the print sheet may be passed once down the print sheet to give full-page images, in what is known as a "full-width array" (FWA) printer. When the printhead and the print sheet are moved relative to each other, imagewise digital data is used to selectively activate the thermal energy generators in the printhead over time so that the desired image will be created on the print sheet.

With the demand for higher resolution printers, the nozzles in ink jet printers are decreasing in size. Nozzle openings are typically about 50 to 80 micrometers in width or diameter for 300 spi printers. With the advent of 600 spi printers, these nozzle openings are typically about 10 to about 40 micrometers in width or diameter. These small dimensions require inks that do not plug the small openings.

Another important measured property for an ink jet ink is high optical density and the latency or decap time, which is the length of time over which an ink remains fluid in a printhead opening or nozzle when exposed to air and, therefore, capable of firing a drop of ink at its intended target. Latency is the maximum idling times allowed for ink to be jetted by a printer with a speed equal to or greater than 5 m/s (equivalent to an ink traveling a distance of 0.5 millimeter in less than 100 $\mu$s) without a failure. This test is run with the printhead or nozzles uncovered or decapped and generally at a relative humidity of 15 percent. The time interval is the longest length of time that the printhead, uncovered, will still fire a specified drop without drop displacement or loss of density. The longer the latency time rating, the more desirable the ink. The inks of the present invention possess many of these characteristics in embodiments thereof.

Moreover, an important characteristic for ink jet inks, especially for pigment, such as carbon black, based inks, is for the pigment dispersion to remain stable throughout the life of the ink jet cartridge. Dye ink jet inks can suffer from deficiencies in waterfastness, smear resistance and lightfastness after being printed on various substrates. Pigments provide an image, on a wide variety of substrates, with in some instances high optical density with high waterfastness, excellent smear resistance and acceptable lightfastness. Therefore, pigments are a preferred alternative to dyes provided the pigment dispersions can be stabilized to prevent flocculation and/or aggregation and settling. Some cosolvents that are suitable as clogging inhibitors cause destabilization of pigment dispersions and, therefore, cannot readily be used in pigmented inks.

There is thus a need for aqueous ink compositions that can be utilized in high resolution ink jet printers. Additionally, there is a need for inks that provide high latency and also remain stable throughout the life of the ink jet cartridge. There is also a need for inks with colorants, such as dyes or pigments, that provide high optical density in a single application or pass. More importantly, there is a need for ink jet inks wherein paper curl, and/or image smearing can be eliminated or minimized when such inks are selected for ink jet printing processes.

SUMMARY OF THE INVENTION

The present invention relates to aqueous ink jet ink compositions comprising water, colorant, especially pigment particles, and certain colored resin emulsion particles. More specifically, the present invention relates to inks containing a resin emulsion derived from olefinic monomers, and wherein one of the olefinic monomers contains a colorant, especially a dye. In embodiments, the olefinic dye molecules can be prepared from the condensation reaction of a functional colorant, especially a dye with an olefinic containing reactive material such as metacryloyl chloride, acryloyl chloride or 4-isocyanate-styrene as illustrated by the formula

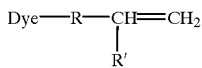

that is wherein an unsaturated isopropenyl group is chemically bonded, or linked to the R group, and wherein Dye represents the colorant, especially dye chromophore, and R is a carbonyl, oxygen, arylene with, for example, from 7 to about 25 carbon atoms, such as phenylene, and the like, and R' is a hydrogen or alkyl group of from about 1 to about 6 carbon atoms. Thereafter, the colored resin emulsion is prepared by mixing the olefinic dye monomer in water, optionally with other olefinic monomers, or monomer, with or without chain transfer agents, surfactants, like Triton X-100, ammonium persulfate, and sodium dodecylbenzene sulfonate, and heating, for example, to about 70 to about 80° C. (Centigrade), or other suitable temperature, for a suitable duration, for example from, for example, about 3 to about 9 hours. Subsequently, the ink is prepared by mixing the resin emulsion generated with pigment, or a pigment dispersion, ink additives such as sulfolane, and the like, and more specifically, wherein a black resin emulsion is mixed with carbon black pigment, especially Levanyl carbon black obtained from Bayer, and wherein the carbon black is a dispersion, especially a one percent dispersion, with sulfolane, glycol, trimethylolpropane, pyrrolidone, and the like.

More specifically, there is provided an aqueous ink jet ink composition comprised of water, colorant, and colored resin emulsion particles generated from olefinic monomers, wherein at least one of said olefinic monomers contains a colorant, wherein the olefinic colorant component is prepared from the condensation reaction of a functional colorant with an olefinic containing reactive material, and which reaction generates

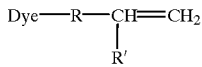

wherein Dye represents a colorant chromophore, and R is a carbonyl, carboxylate, oxygen, or arylene, and R' is hydrogen or alkyl; an ink wherein the colorant is a dye of black, cyan, yellow, magenta, red, blue, green, orange or brown; an ink wherein the colorant is a dye chemically bound to a polymer resin emulsion generated by the emulsion polymerization of an olefinic dye monomer with at least one unsaturated monomer; an ink wherein the unsaturated monomer is methyl acrylate, methyl methacrylate, ethyl acrylate, ethyl methacrylate, propyl acrylate, propyl methacrylate, butyl acrylate, butyl methacrylate, hexyl acrylate, hexyl methacrylate, pentyl acrylate, pentyl methacrylate, heptyl acrylate, heptyl methacrylate, octyl acrylate, octyl methacrylate, nonyl acrylate, nonyl methacrylate, decylacrylate, decylmethacrylate, lauryl acrylate, lauryl methacrylate, stearyl acrylate, stearyl methacrylate, dodecyl acrylate, or dodecyl methacrylate, polyethylene glycol methacrylate, and which monomer is selected in an effective amount of from about 20 to about 90 weight percent of the resin emulsion, and preferably of from about 20 to about 60 weight percent of the resin emulsion; an ink wherein the unsaturated monomer is methacrylic acid, benzyl methacrylate, or polyethyleneglycol (meth)acrylate; an ink wherein the olefinic dye monomer is represented by the formula

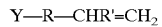

wherein Y is NCO, Cl, or Br; R is CO or an aromatic group of phenylene, and R' is H or $CH_3$; an ink wherein the olefinic dye molecule is obtained from the condensation of a functional dye and a reactive unsaturated component; an ink wherein the functional dye is of the formulas

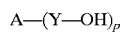

where A is an organic chromophore, Y is a straight chain or branched polyoxyalkylene substituent with from about 1 to about 200 carbons, and p is from about 1 to 4 and represents the number of chains per chromophore bonded to the polyoxyalkylene substituent by a linking group of N, $NR_3$, O, S, $SO_2$, $SO_2N$, $SO_2NR_3$, $CO_2$, CON, $CONR_3$, where R is H, $C_1$ to $C_{12}$ alkyl, phenyl or benzyl; or

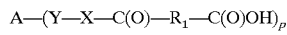

where A is an organic chromophore, Y is a polyalkylene substituent with from about 1 to about 100 carbon atoms, p is an integer of from about 1 to 4; X is a nucleophile of O, $NR_2$, or S wherein $R_2$ is H or a $C_1$ to $C_{18}$ alkyl; $R_1$ is alkylene, alkenylene, phenylene, and phenylenealkylene, any of which may be optionally substituted with alkyl, alkenyl or aryl groups, provided that the total number of carbon atoms is from about 2 to 30; an ink wherein the reactive unsaturated component is acryloxy chloride, acryloxy bromide, acryloxy iodide, methacryloxy chloride, methacryloxy bromide, 4-isocyanato-1-isopropenylbenzene, or isocyanato-isopropenyl; an ink wherein the resin emulsion possesses an $M_w$ of from about 5,000 grams per mole to about 300,000 grams per mole; an ink wherein the resin emulsion possesses an $M_n$ of from about 2,000 grams per mole to about 150,000 grams per mole; an ink further containing ink additives; an ink wherein the ink additive is a surfactant; an ink wherein the surfactant is selected in an amount of from about 0.005 to about 20 weight percent; an ink wherein the surfactant is selected in an amount of from about 0.1 to about 10 weight percent; an ink wherein the colorant is present in an amount of from about 4 to about 10 percent by weight of said ink composition; an ink wherein the colorant is a pigment of carbon black, cyan, magenta, yellow, or mixtures thereof; an ink with a latency of from about 20 to about 60 seconds; a smear ratio value of from about 0 to about 0.06, and an optical density for the images developed with said ink of from about 1.2 to about 1.6; an ink further containing biocides and humectants; an ink wherein the biocides and humectants are each present in an amount of from about 0.01 to about 50 weight percent; an imaging process which comprises the development of an image with the invention ink composition illustrated herein, and which image is fixed on a substrate; a high resolution printing process comprising applying in imagewise fashion to a substrate in a printer having at least one nozzle of a channel width or diameter ranging from about 10 to about 40 microns the invention aqueous ink jet ink; and a process wherein the substrate is paper and paper curl is minimized or eliminated, or wherein the substrate is paper, image smearing is minimized or eliminated, and the optical density of the developed images is at least 1.25; an ink wherein arylene contains from 7 to about 25 carbon atoms.

In embodiments, the olefinic dye monomer can be prepared by the reaction of a polyol-dye chromophore with 4-isocyanato-styrene as illustrated by the formula;

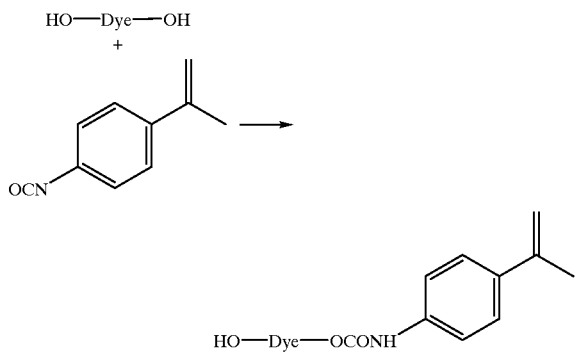

wherein attached to the two (2) position of the aromatic ring is isopropenyl.

More specifically, the olefinic dye monomer can be prepared by charging a reactor with about 411 grams of a polyol-dye, such as REACTINT BLACK X57AB™ obtained from Milliken Chemicals, and about 60 grams of 4-isocyanato-1-isopropenylbenzene and about 1 gram of UNICURE® as the condensation catalyst, and which catalyst is available from, and was obtained from Uniroyal Corporation. The resulting mixture was stirred at 70° C. for a duration of about 3 hours, followed by cooling to room temperature to provide the olefinic dye monomer product.

The colored resin emulsion can be prepared by emulsion polymerization of the aforementioned olefinic dye monomer by conventional process. More specifically, the colored resin emulsion can be prepared by charging a vessel with about 50 grams of the aforementioned olefinic dye monomer obtained from REACTINT BLACK X57AB™ and 4-isocyanato-isopropenylbenzene, about 45 grams of butyl methacrylate, about 10 grams of methacrylic acid, about 400 grams of water, about 2.0 grams of sodium dodecylbenzene sulfonate, about 3 grams of potassium persulfate, and about 2 grams of Triton X-100 obtained from Aldrich Chemicals. The mixture was then stirred and heated to about 80° C. for a duration of about 6 hours.

The ink is formulated by the mixing of from about 0.5 to about 5 eight percent of the formed resin emulsion with from about 3 to about 7 eight percent of pigment, such as carbon black dispersion obtained from Bayer Corporation as Levanyl carbon black, from about 10 to about 60 percent by weight of cosolvent such as 2-pyrrolidinone, sulfolane, trimethylopropane, glycol or mixtures thereof, the remaining about 10 to about 40 weight percent of the ink being water. Other additives such as biocides, or jetting additives may also be added to the ink. Resin emulsions are illustrated in the copending application mentioned hereinbefore.

Also, the present invention relates to a high resolution printing process comprising applying the invention ink composition in imagewise fashion to a substrate. The ink possesses a latency of, for example, at least about 20 seconds and, for example, from about 20 to about 75 seconds in, for example, a printer with at least one nozzle of a channel width or diameter of from about 10 to about 40 microns and wherein substrate, such as paper curl, is minimized or eliminated.

Important embodiments of the present invention include an imaging process which comprises the development of an image with the aqueous ink jet ink composition illustrated herein; an imaging process which comprises the development of an image with the invention aqueous ink jet ink composition, and wherein images with minimal curling and minimal smearing are obtained; a high resolution printing process comprising applying in imagewise fashion to a substrate in a printer having at least one nozzle of a channel width or diameter ranging from about 10 to about 4 microns the invention aqueous ink jet ink composition; a process for reducing or eliminating paper curl and improving optical density in a xerographic ink jet apparatus which comprises generating images in the apparatus and developing the images with the invention aqueous ink jet ink composition.

Imaging processes of the present invention in embodiments thereof possess numerous advantages including excellent waterfastness, acceptable lightfastness, low product cost, high image resolution, excellent print quality on a variety of substrates, excellent jetting capability with high drop velocity, longer latency, larger drop mass or drop volume which provides optimal optical density in a single pass, high frequency response which allows for high speed printing, excellent printhead recoverability and maintainability, excellent ink stability, minimal ink and pigment settling, a lack of printhead kogation and more importantly, wherein the inks when selected for ink jet processes enable the minimization of paper curl, smearing is avoided or minimized, and the image optical densities are excellent. The inks possess excellent waterfastness between, for example, from about 95 to about 100 percent, and acceptable lightfastness between, for example, from about 90 to about 100 percent. More preferably, the inks possess a smear ratio defined as optical density adjacent to the image after smearing divided by the original optical density of the image in the range of between from about 0 to about 0.10. The image optical density that is preferred is in the range of 1.25 to about 1.5.

The olefinic dye molecule is generally prepared from the condensation of a dye chromophore containing at least one functional group such as an hydroxyl moiety, with an olefinic reactive compound such as an isocyanate or acryloxy chloride. In embodiments, the dye is in the form of a chromophore having at least one —OH group. The presence of the —OH group permits the dye to be chemically bonded to the olefinic material by reaction with the isocyanate group or acid chloride group of the olefinic reactive compound. Examples of such dyes are those having the following formula

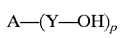

where A is an organic dye chromophore, Y is a straight chain or branched polyoxyalkylene such as polyethylene glycol or polypropylene glycol with, for example, from about 1 to about 200 carbon atoms, and p represents the number of chains per chromophore and preferably is from about 1 to about 4 chains. The chromophore is generally covalently bonded to the polyoxyalkylene substituent by a linking group such as N, $NR_3$, O, S, $SO_2$, $SO_2N$, $SO_2NR_3$, $CO_2$, CON, $CONR_3$, wherein R is H, $C_1$ to $C_{12}$ alkyl, aryl with, for example, 6 to about 24 carbon atoms, such as phenyl or benzyl. These dyes may be represented generally by the formula

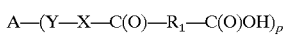

where A is an organic chromophore, Y is a polyalkylene substituent with, for example, from about 1 to about 100 carbon atoms, p is an integer of from about 1 to 4; X is a nucleophile of O, $NR_2$, and S wherein $R_2$ is H or a $C_1$ to $C_{18}$ alkyl; $R_1$ is alkylene, alkenylene, phenylene, and phenylenealkylene, any of which may be optionally substituted with alkyl, alkenyl or aryl groups, provided that the total number of carbon atoms is from about 2 to about 30. The dyes are described in more detail in U.S. Pat. No. 5,310,887, the disclosure of which is totally incorporated herein by reference.

The reactive olefinic material utilized for the condensation reaction with the dye is represented by the formula

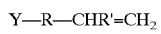

wherein Y is NCO, Cl, Br, F, I; R is CO or an aromatic group with, for example, from 6 to about 30 carbon atoms, such as phenylene, and R' is H or an alkyl such as a $CH_3$ group.

The reactive olefinic material or component selected for condensation with the dye includes acryloxy halides, such as acryloxy chloride, acryloxy bromide, acryloxy iodide, methacryloxy chloride, methacryloxy bromide, 4-isocyanato-1-isopropenylbenzene, isocyanato-isopropenyl, mixtures thereof, and like. The reactive olefinic material is selected in various amounts, for example effective amounts of from about 45 to about 55 mole percent of the olefinic dye product.

The dye chromophore selected for the condensation reaction with the reactive olefinic material can be of any suitable color, such as black, cyan, magenta, yellow, red, blue, green, brown, mixtures thereof, and the like, and present in the condensation product in various amounts, such as an amount of, for example, from about 45 mole percent to about 55 mole percent. Preferred dyes are cyan and magenta dyes available from Milliken, such as REACTINT BLUE X17AB™, REACTINT X3LV™, PALMER BLUE™, REACTINT BLUE X19™, and magenta REACTINT RED X52™; REACTINT YELLOW X15™, REACTINT BLACK 57AB™, REACTINT BLACK X40LV™, REACTINT ORANGE X38™, REACTINT VIOLET X80™, mixtures thereof, and the like.

The olefinic monomer selected for the colored resin emulsion can, for example, be alkyl acrylate or alkyl methacrylate, methyl acrylate, methyl methacrylate, ethyl acrylate, ethyl methacrylate, propyl acrylate, propyl methacrylate, butyl acrylate, butyl methacrylate, hexyl acrylate, hexyl methacrylate, pentyl acrylate, pentyl methacrylate, heptyl acrylate, heptyl methacrylate, octyl acrylate, octyl methacrylate, nonyl acrylate, nonyl methacrylate, decylacrylate, decylmethacrylate, lauryl acrylate, lauryl methacrylate, stearyl acrylate, stearyl methacrylate, dodecyl acrylate, or dodecyl methacrylate, polyethylene glycol methacrylate, and the like. The olefinic monomer is utilized in an effective amount of, for example, from about 0 to about 60 weight percent of the resin emulsion, and preferably of from about 10 to about 60 weight percent of the resin emulsion.

The liquid vehicles include water, or may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, and mixtures thereof.

When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside these ranges. The non-water component of the liquid vehicle generally serves as a humectant which has a boiling point higher than that of water (100° C.). The pigment dispersion can be mixed with different humectants or solvents in ink jet inks including ethyleneglycol, diethyleneglycol, propyleneglycol, dipropylene glycol, polyethylene glycols, polypropylene glycols, glycerine, trimethylolpropane, 1,5-pentanediols, 1,6-hexanediols, diols and triols containing 2 to 10 carbons; sulfoxides, for example dimethyl sulfoxides, alkylphenyl sulfoxides, and the like; sulfones, such as sulfolane, dialkyl sulfones, alkyl phenyl sulfones, and the like; amides such as N,N-dialkyl amides, N,N-alkyl phenyl amides, N-methylpyrrolidinone, N-cyclohexylpyrrolidinone, N,N-diethyltoluamide, and the like; ethers such as alkyl ether derivatives of alcohol, etherdiols, and ethertriols including butylcarbitol, alkyl polyethylene glycols, and the like; urea, betaine, or the thio (sulfur) derivatives of the aforementioned components, such as, for example, thioethyleneglycol, trithioethyleneglycol, and the like. Desired penetrants, water soluble polymers, pH buffer, biocides, chelating agents (EDTA and the like), and optional additives can also be included in the inks.

The liquid vehicle is generally present in an amount of from about 50 to about 99.5 percent by weight, preferably about 55 to about 95 percent by weight, and more preferably from about 60 to about 90 percent by weight, although the amount may be outside these ranges.

The colorant for the ink compositions is preferably, for example, a pigment, or a mixture of one or more pigments. The pigment can be black, cyan, magenta, yellow, red, blue, green, brown, mixtures thereof, and the like, and is preferably the carbon black Levanyl carbon black obtained from Bayer, carbon black products obtained from Cabot Corporation. Examples of suitable black pigments include various carbon blacks such as channel black, furnace black, lamp black, and the like. Colored pigments include red, green, blue, brown, magenta, cyan, and yellow particles, and mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido) phthalocyanine, X-copper phthalocyanine pigment, listed in the color index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. The preferable pigment dispersions include carbon blacks, such as Hostafine Black (T and TS), Sunsperse 9303, and Levanyl Black A-SF. Of these, Levanyl Black A-SF is the most preferred. Colorants include dyes, pigments, mixtures thereof, mixtures of pigments, mixtures of dyes, and the like.

Preferably, the pigment particle size is small to primarily enable a stable colloidal suspension of the particles in the liquid vehicle and to prevent clogging of the ink channels when the ink is selected for a thermal ink jet printer. Preferred particle average diameters are generally from about 0.001 to about 5 microns, and more preferably from about 0.01 to about 3 microns, although the particle size may be outside these ranges. A more preferred pigment particle size includes particles having at least 70 percent of the particles being below about 0.1 micron with no particles being greater than about 1.0 micron (measured on a Hodaka CAPA 700 Particle Size Analyzer). More preferably, the pigment particle size includes particles having at least 90 percent of the particles being below 0.1 micron with no particles being greater than 1.0 micron.

The colorant, especially pigment, is present in the ink composition in various effective amounts and generally from about 1 to about 20 percent by weight, preferably from about 3 to about 10 percent by weight, more preferably from about 4 to about 9 percent by weight, and most preferably from about 5 to about 8 percent, although the amount may be outside of these ranges.

Polymeric additives can also be added to the inks to, for example, enhance the viscosity of the ink, including water soluble polymers, such as gum arabic, polyacrylate salts, polymethacrylate salts, polyvinyl alcohols, hydroxypropyl cellulose, hydroxyethyl cellulose, polyvinylpyrrolidinone, polyvinylether, polyethyleneimines derivatized with polyethylene oxide and polypropylene oxide, such as the DISCOLE® series available from DKS International, Tokyo, Japan, the JEFFAMINE® series available from Texaco, Bellaire, Tex., and the like. Polymeric additives may be present in the ink of the present invention in amounts of from 0 to about 10 percent by weight, preferably from about 0.001 to about 8 percent by weight, and more preferably from about 0.01 to about 5 percent by weight, although the amount may be outside these ranges.

Further, optional additives include biocides such as DOWICIL™ 150, 200, and 75, benzoate salts, sorbate salts, and the like, present in an amount of from 0 to about 10 percent by weight, preferably from about 0.001 to about 8 percent by weight, and more preferably from about 0.01 to about 4.0 percent by weight, although the amount may be outside these ranges; penetration control additives such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight, although the amount may be outside these ranges, pH controlling agents such as acids or bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount may be outside these ranges, or the like.

Other examples of suitable ink additives include those illustrated in U.S. Pat. No. 5,223,026 and U.S. Pat. No. 5,207,825, the disclosure of each of which is totally incorporated herein by reference.

Aqueous ink compositions, according to the present invention, may also be provided by mixing the formed inks with humectants, and other ink additives. The mixing can be accomplished by various methods including homogenizing, sonification, microfluidization, mechanical mixing, magnetic stirring, high speed jetting, and the like.

The dispersed pigment can be used as is, but preferably the thoroughly mixed pigment dispersion mixture is first centrifuged by a batch process or a continuous process utilizing commercially available equipment, such as bottle centrifuges, preparative ultracentrifuges, analytical ultracentrifuges, zonal centrifuges, tubular centrifuges, disk centrifuges, continuous conveyor-discharge centrifuges, basket centrifuges, liquid cyclones, and the like to remove large pigment particles from the ink. Centrifuging should be conducted for a time sufficient to remove large size particles and at a rate of from about 4,000 to about 8,000 rpm. The continuous centrifuge process is very useful in the commercial production of large quantities of pigment ink for the separation of large pigment particles from the ink. The ink is also preferably subjected to a filtration process which utilizes various commercial filtration media including cartridges constructed from nylon, polyester, TEFLON®, polysulfone, glass fiber and polyethylene, and other suitable polymeric materials; membranes; porous ceramic media; cloth; and the like. The filter should be of a size to remove particles greater than 3 μm in size, preferably greater than 1.2 μm in size, most preferably greater than 1 μm in size. Any suitable filtration method, such as continuous and/or batch filtration methods, may be used. Continuous filtration methods are preferred for large scale production of pigment inks. Inks which have been centrifuged and filtered so as to preferably remove particles greater than 1 μm in size from the ink are suitable for use as ink jet inks because of their ability to not clog the ink jet and their long latency and jetting stability.

The ink may be applied to a suitable substrate in imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox Corporation series 10 paper, Xerox Corporation 4024 paper, or the like, coated papers, such as those available from Jujo, transparency materials suitable for aqueous inks or ink jet printing processes, or the like.

The following Examples and Comparative Examples and data are provided.

EXAMPLE I

Preparation of an olefinic dye monomer from the condensation reaction of 50 mole percent of 4-isocyanato-1-isopropenylbenzene and 50 mole percent of a dye chromophore available as REACTINT BLACK X57AB™ from Milliken Chemicals.

To a 2 liter vessel were charged 411 grams of REACTINT BLACK X57AB™ obtained from Milliken Chemicals, and 60 grams of 4-isocyanato-1-isopropenylbenzene with about 1 gram of Unicure catalyst available from Uniroyal Chemical Company, and which catalyst may be an aromatic aniline. The resulting mixture was stirred at 70° C. for a duration of 3 hours, followed by cooling to room temperature, about 25° C., to provide the olefinic dye monomer product.

EXAMPLE II

Preparation of an olefinic dye monomer from the condensation reaction of 50 mole percent of 4-isocyanato-1-isopropenylbenzene, and 50 mole percent of a dye chromophore available as REACTINT YELLOW X17™ from Milliken Chemicals.

To a 2 liter vessel were charged 350 grams of REACTINT YELLOW X17™ obtained from Milliken Chemicals, and 60 grams of 4-isocyanato-1-isopropenylbenzene with about 1 gram of Unicure as the condensation catalyst, and which catalyst was obtained from Uniroyal. The resulting mixture was stirred at 70° C. for a duration for 3 hours, followed by cooling to room temperature, about 25° C. throughout, to provide the above olefinic dye monomer product.

EXAMPLE III

Preparation of an olefinic dye monomer from the condensation reaction of 50 mole percent of 4-isocyanato-1-isopropenylbenzene, and 50 mole percent of a dye chromophore available as REACTINT BLUE X15™ from Milliken Chemicals.

To a 2 liter vessel were charged 400 grams of REACTINT BLUE X15™ obtained from Milliken Chemicals, and 60 grams of 4-isocyanato-1-isopropenylbenzene with about 1 gram of Unicure as the condensation catalyst, and which catalyst was obtained from Uniroyal. The resulting mixture was stirred at 70° C. for a duration of 3 hours, followed by cooling to room temperature to provide the olefinic dye monomer product.

EXAMPLE IV (GS705)

Preparation of a colored resin emulsion derived from 30 weight percent of the olefinic dye monomer of Example I, 49 weight percent of benzyl methacrylate, and 21 weight percent of methacrylic acid.

To a 2 liter vessel were added 250 grams of water, 2.0 grams of Triton X-100 surfactant obtained from Aldrich Chemicals, and 1.8 grams of sodium dodecylbenzene sulfonate. The resulting mixture was stirred for about 1 hour, after which were added 47 grams of the olefinic dye monomer product of Example I, 66.5 grams of benzyl methacrylate, 28.3 grams of methacrylic acid, and 1.8 grams of ammonium persulfate. The mixture was then heated to 80° C. for a duration of 6 hours to result in a black colored emulsion resin.

EXAMPLE V (GS706)

Preparation of a colored resin emulsion derived from 34 weight percent of the olefinic dye monomer of Example I, 47 percent by weight of benzyl methacrylate, and 19 percent by weight of methacrylic acid.

To a 2 liter reaction vessel were added 250 grams of water, 2.0 grams of Triton X-100 surfactant obtained from Aldrich Chemicals, and 1.8 grams of sodium dodecylbenzene sulfonate. The resulting mixture was stirred for about 1 hour, and thereafter, there were added 50 grams of the olefinic dye monomer product of Example I, 61 grams of benzyl methacrylate, 28.3 grams of methacrylic acid, and 1.8 grams of ammonium persulfate. The mixture was then heated to 80° C. for a duration of 6 hours to result in a black colored emulsion resin.

EXAMPLE VI (GS707)

Preparation of a colored resin emulsion derived from 53 weight percent of the olefinic dye monomer of Example I, 29 weight percent of benzyl methacrylate, and 18 weight percent of methacrylic acid.

To a 2 liter reaction vessel were added 250 grams of water, 2.0 grams of Triton X-100 surfactant obtained from Aldrich Chemicals, and 1.8 grams of sodium dodecylbenzene sulfonate. The mixture was stirred for about 1 hour, after which were added 74 grams of the olefinic dye monomer product of Example I, 41 grams of benzyl methacrylate, 25 grams of methacrylic acid and 1.8 grams of ammonium persulfate. The mixture was then heated to 80° C. for a duration of 6 hours to result in a black colored emulsion resin.

EXAMPLE VII (GS708)

Preparation of a colored resin emulsion derived from 53 weight percent of the olefinic dye monomer of Example II, 29 weight percent of benzyl methacrylate, and 18 weight percent of methacrylic acid.

To a 2 liter reaction vessel were added 250 grams of water, 2.0 grams of Triton X-100 surfactant obtained from Aldrich Chemicals, and 1.8 grams of sodium dodecylbenzene sulfonate. The resulting mixture was stirred for about 1 hour, and thereafter, there were added 47 grams of the olefinic dye monomer product of Example II, 66.5 grams of benzyl methacrylate, 28.3 grams of methacrylic acid, and 1.8 grams of ammonium persulfate. The mixture was then heated to 80° C. for a duration of 6 hours to result in a blue colored emulsion resin.

EXAMPLE VIII

Preparation of a colored resin emulsion derived from 53 weight percent of the olefinic dye monomer of Example III, 29 weight percent of benzyl methacrylate, and 18 weight percent of methacrylic acid.

To a 2 liter reaction vessel were added 250 grams of water, 2.0 grams of Triton X-100 surfactant obtained from Aldrich Chemicals, and 1.8 grams of sodium dodecylbenzene sulfonate. The resulting mixture was stirred for about 1 hour, after which were added 47 grams of the olefinic dye monomer product of Example III, 66.5 grams of benzyl methacrylate, 28.3 grams of methacrylic acid, and 1.8 grams of ammonium persulfate. The mixture was then heated to 80° C. for a duration of 6 hours to result in a yellow colored emulsion resin.

The Levanyl carbon black dispersion (obtained from Bayer Corporation) was centrifuged to remove large (>1 µm) particles. The carbon black dispersion was filtered through a 1 µm glass fiber filter prior to making inks. All Examples herein utilize the preprocessed Levanyl carbon black dispersion, unless otherwise specified.

EXAMPLE IX

Preparation of Ink

A black colored ink jet ink composition was prepared by mixing 16 weight percent of diethylene glycol (obtained from Aldrich), 15 weight percent of 2-pyrrolidinone (obtained from Aldrich), and water (ink balance to total 100 percent). The vehicle resulting and the colored resin emulsion of Example IV, about 0.55 percent solids equivalent, were added to the vehicle mixture and stirred for about 5 to 10 minutes. The resultant mixture was added to the Levanyl carbon black dispersion (obtained from Bayer Corporation), 7 weight percent of carbon black. The ink mixture was stirred for about 5 minutes, and thereafter, the ink mixture was filtered through a 1 µm glass fiber filter. The final ink comprised 16 weight percent of diethylene glycol, 15 weight percent of 2-pyrrolidinone, 0.55 weight percent solids equivalent of the colored resin emulsion, 7 weight percent of Levanyl carbon black, and 1 weight percent of polymeric dispersant, naphthalene sulfonic acid formaldehyde condensate, which is contained in the commercially available Levanyl carbon black, and the balance is water to total 100 weight percent.

EXAMPLE IX

Preparation of Ink:

A black colored ink jet ink composition was prepared by mixing 20 weight percent of Sulfolane (obtained from Bayer) and water (ink balance to total 100 percent). The colored resin emulsion of Example V, about 1 percent solids equivalent, was added to the prepared vehicle mixture and stirred for about 5 to 10 minutes. The resultant mixture was added to Levanyl carbon black dispersion (obtained from Bayer Corporation), 7 weight percent carbon black. The ink mixture was stirred for about 5 minutes, and then the ink mixture was filtered through a 1 µm glass fiber filter. The final ink comprised 20 weight, 1 weight percent solids equivalent of the colored resin emulsion, 7 weight percent of Levanyl carbon black, and 1 weight percent of the polymeric dispersant, naphthalene sulfonic acid formaldehyde condensate which was contained in the commercially available Levanyl carbon black, and the balance was water to enable total of about 100 weight percent.

EXAMPLE XI

Preparation of Ink

A black colored ink jet ink composition was prepared by mixing 16 weight percent of diethylene glycol (obtained from Aldrich), 15 weight percent of 2-pyrrolidinone (obtained from Aldrich), and water (ink balance to total 100 percent). The vehicle resulting and the colored resin emulsion of Example VI about 0.55 percent solids equivalent, was added to the vehicle mixture and stirred for about 5 to 10 minutes. The resultant mixture was added to the Levanyl carbon black dispersion (obtained from Bayer Corporation), 7 weight percent of carbon black. The ink mixture was stirred for about 5 minutes and then the ink mixture was filtered through a 1 µm glass fiber filter. The final ink comprised 16 weight percent of diethylene glycol, 15 weight percent of 2-pyrrolidinone, 0.55 weight percent solids equivalent of the colored resin emulsion, 7 weight percent of Levanyl carbon black, and 1 weight percent of the polymeric dispersant, naphthalene sulfonic acid formaldehyde condensate, which was contained in the commercially available Levanyl carbon black, and the balance was water to enable a total of about 100 weight percent for all the ink components.

EXAMPLE XII

Preparation of Ink

A black colored ink jet ink composition was prepared by mixing 16 weight percent of diethylene glycol (obtained from Aldrich), 15 weight percent of 2-pyrrolidinone (obtained from Aldrich), and water (ink balance to total 100 percent). The vehicle resulting and the colored resin emulsion of Example VII, about 0.55 percent solids equivalent, were added to the vehicle mixture and stirred for about 5 to 10 minutes. The resultant mixture was added to the Levanyl carbon black dispersion (obtained from Bayer Corporation), 7 weight percent of carbon black. The ink mixture was stirred for about 5 minutes, and thereafter, the ink mixture was filtered through a 1 µm glass fiber filter. The final ink comprised 16 weight percent of diethylene glycol, 15 weight percent of 2-pyrrolidinone, 0.55 weight percent solids equivalent of the colored resin emulsion, 7 weight percent of Levanyl carbon black, and 1 weight percent (weight percent throughout) of the polymeric dispersant, naphthalene sulfonic acid formaldehyde condensate, which was contained in the commercially available Levanyl carbon black, and the balance was water to enable for all ink components a total of 100 weight percent.

Comparative Example 1

Preparation of Ink

A black colored ink jet ink composition was prepared by mixing 16 weight percent of diethylene glycol (obtained from Aldrich), 15 weight percent of 2-pyrrolidinone (obtained from Aldrich), and water (ink balance to total 100 percent). The resultant mixture was added to the Levanyl carbon black dispersion (obtained from Bayer Corporation), 7 weight percent of carbon black. The ink mixture was stirred for about 5 minutes. The ink mixture was then filtered through a 1 µm glass fiber filter.

The final ink comprised 16 weight percent of diethylene glycol, 15 weight percent of 2-pyrrolidinone, 7 weight percent of Levanyl carbon black, and 1 weight percent of the polymeric dispersant, naphthalene sulfonic acid formaldehyde condensate, which was contained in the commercially available Levanyl carbon black, and the balance was water to enable for all ink components a total of 100 weight percent.

EVALUATIONS

The properties of the ink compositions were evaluated in the following manner:

A) Physical Properties

The viscosity of the ink was measured at 25° C. using a Brookfield Model DV-11 viscometer.

The surface tension of the ink was measured at 25° C. using a Kruss model K10T plate tensiometer.

The pH was measured at 25° C. using a Corning model 345 pH meter.

B) Smear Resistance

The images were placed in an ink jet printer HP850C (Hewlett Packard). After an image was printed, the image was allowed to stand, or remain at room temperature, about 25° C., for 24 hours prior to evaluation. The optical density of the solid area was measured prior to smear testing using a densitometer (X-Rite 428). The images were printed on several media such as Xerox Courtland 4024DP and Image Series LX paper. A clean sheet of the matching paper was placed on top of the solid area image. Using a rub tester (Manufactured by Testing Machines Inc.), a 4 pound weight was placed on top of the covered image. At a speed of 85 rubs per minute, the image was subjected to 50 rubs at 25° C. and 50 percent RH. The area adjacent to the solid area image was measured using the densitometer.

C) Stability

50 Grams of ink were placed in a capped bottle and allowed to stand at a temperature of 60° C. for 24 hours. The ink physical properties were measured after heat treatment. For comparison, the shelf no emulsion standing ink was also measured for physical properties after 24 hours. Changes greater than about 0.4 centipoise units for viscosity indicate instability. Observation of the ink standing on the shelf at room temperature, about 25° C. throughout, for settling were also tested for extended periods of up to 1.5 years.

D) Optical Density

An image was printed by an ink jet printer HP855C on each of the following papers: Xerox Courtland 4024DP and Images Series LX. The optical density of the printed image was measured by an X-Rite densitometer.

TABLE 1

Physical Properties for Stability Measured at 25° C.

| Example | Viscosity cPs | Surface Tension D/cm | pH | 60° C./24 hour Heat Treatment | | |
|---|---|---|---|---|---|---|
| | | | | Viscosity cPs | Surface Tension D/cm | pH |
| IX | 3.3 | 52 | 4.8 | 3.3 | 53 | 4.8 |
| X | 3.5 | 56 | 5.14 | 3.6 | 55 | 5.14 |
| XI | 3.7 | 56 | 5 | 3.7 | 56 | 4.98 |
| XII | 3.4 | 57 | 5.99 | 3.5 | 57 | 5.78 |
| Comparative | 3.5 | 56 | 6.42 | 3.5 | 57 | 6.03 |

The Examples with colored resin emulsion indicate that the addition of resin emulsion did not cause instability in the ink formulations. Instability would be evident as an increase in viscosity, over about 0.4 centipoise. Settling or precipitation was not evident for the invention ink Examples.

TABLE 2

| | Optical density | | Smear Ratio = Smear od/Image od | |
|---|---|---|---|---|
| Example | Xerox 4024DP | Image Series LX | Xerox 4024DP | Image Series LX |
| IX | 1.30 | 1.40 | 0.10 | 0.08 |
| X | 1.20 | 1.30 | 0.07 | 0.09 |
| XI | 1.26 | 1.37 | 0.05 | 0.10 |
| XII | 1.26 | 1.22 | 0.09 | 0.10 |
| Comparative 1 | 1.27 | 1.30 | 0.13 | 0.18 |

These Examples indicate some enhancement in optical density at only 0.55 weight percent solids equivalent of the color resin emulsion in the ink formulation contrasted to the Comparative Example.

Improvements in the smear were also found in contrast to the Comparative Example.

The interaction of the colored resin emulsion and pigment on paper resulted in more pigment agglomerations on the surface of the paper. This allowed for higher optical density since some of the pigment did not penetrate into the paper fibers. With the colored resin emulsion acting as a binder, the smear resistance was improved. The agglomerates of the pigment and colored resin allowed for fixing onto the paper and among particles. This imparts smear resistance.

Other modifications of the present invention may occur to those of ordinary skill in the art subsequent to a review of the present application, and these modifications, including equivalents thereof, are intended to be included within the scope of the present invention.

What is claimed is:

1. An imaging process which comprises the development of an image with an ink composition comprised of water, colorant, and colored resin emulsion particles generated from olefinic monomers, wherein at least one of said olefinic monomers contains a colorant, wherein the olefinic colorant component is prepared from the condensation reaction of a functional colorant with an olefinic containing reactive material, and which reaction generates

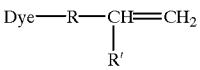

wherein Dye represents a colorant chromophore, and R is a carbonyl, carboxylate, oxygen, or arylene, and R' is hydrogen or alkyl, and which image is optionally fixed on a substrate.

2. A high resolution printing process comprising applying in imagewise fashion to a substrate in a printer having at least one nozzle of a channel width or diameter ranging from about 10 to about 40 microns an aqueous ink jet ink composition comprised of water, colorant, and colored resin emulsion particles generated from olefinic monomers, wherein at least one of said olefinic monomers contains a colorant, wherein the olefinic colorant component is prepared from the condensation reaction of a functional colorant with an olefinic containing reactive material, and which reaction generates

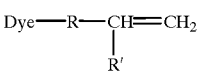

wherein Dye represents a colorant chromophore, and R is a carbonyl, carboxylate, oxyqen, or arylene, and R' is hydrogen or alkyl, and which image is fixed on a substrate.

3. A process in accordance with claim 1 wherein the substrate is paper and paper curl is minimized or eliminated, or wherein the substrate is paper, image smearing is minimized or eliminated, and the optical density of the developed images is at least 1.25.

4. A process in accordance with claim 2 wherein the colorant is black, cyan, yellow, magenta, red, blue, green, orange, brown, or mixtures thereof.

5. A process in accordance with claim 2 wherein the colorant is a dye chemically bound to a polymer resin emulsion generated by the emulsion polymerization of an olefinic dye monomer with at least one unsaturated monomer.

6. A process in accordance with claim 5 wherein said unsaturated monomer is methyl acrylate, methyl methacrylate, ethyl acrylate, ethyl methacrylate, propyl acrylate, propyl methacrylate, butyl acrylate, butyl methacrylate, hexyl acrylate, hexyl methacrylate, pentyl acrylate, pentyl methacrylate, heptyl acrylate, heptyl methacrylate, octyl acrylate, octyl methacrylate, nonyl acrylate, nonyl methacrylate, decylacrylate, decylmethacrylate, lauryl acrylate, lauryl methacrylate, stearyl acrylate, stearyl methacrylate, dodecyl acrylate, or dodecyl methacrylate, polyethylene glycol methacrylate, and which monomer is selected in an effective amount of from about 20 to about 90 weight percent of the resin emulsion, and preferably of from about 20 to about 60 weight percent of the resin emulsion.

7. A process in accordance with claim 6 wherein the unsaturated monomer is methacrylic acid, benzyl methacrylate, or polyethyleneglycol (meth)acrylate.

8. A process in accordance with claim 6 wherein the olefinic dye monomer is represented by the formula

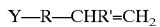

wherein Y is NCO, Cl, or Br; R is CO or an aromatic group of phenylene, and R' is H or $CH_3$.

9. A process in accordance with claim 8 wherein the olefinic dye molecule is obtained from the condensation of a functional dye and a reactive unsaturated component.

10. A process in accordance with claim 9 wherein the functional dye is of the formulas

  (I)

where A is an organic chromophore, Y is a straight chain or branched polyoxyalkylene substituent with from about 1 to about 200 carbons, and p is from about 1 to 4 and represents the number of chains per chromophore bonded to the polyoxyalkylene substituent by a linking group of N, $NR_3$, O, S, $SO_2$, $SO_2N$, $SO_2NR_3$, $CO_2$, CON, $CONR_3$, where R is H, $C_1$ to $C_{12}$ alkyl, phenyl or benzyl; or

  (II)

where A is an organic chromophore, Y is a polyalkylene substituent with from about 1 to about 100 carbon atoms, p is an integer of from about 1 to 4; X is a nucleophile of O, $NR_2$, or S wherein $R_2$ is H or a $C_1$ to $C_{18}$ alkyl; $R_1$ is alkylene, alkenylene, phenylene, and phenylenealkylene, any of which may be optionally substituted with alkyl, alkenyl or aryl groups, provided that the total number of carbon atoms is from about 2 to 30.

11. A process in accordance with claim 9 wherein the reactive unsaturated component is acryloxy chloride, acryloxy bromide, acryloxy iodide, methacryloxy chloride, methacryloxy bromide, 4-isocyanato-1-isopropenylbenzene, or isocyanato-isopropenyl.

12. A process in accordance with claim 2 wherein said resin emulsion possesses an $M_w$ of from about 5,000 grams per mole to about 300,000 grams per mole.

13. A process in accordance with claim 2 wherein said resin emulsion possesses an $M_n$ of from about 2,000 grams per mole to about 150,000 grams per mole.

14. A process in accordance with claim 2 further containing ink additives.

15. A process in accordance with claim 2 wherein said colorant is present in an amount of from about 4 to about 10 percent by weight of said ink composition.

16. A process in accordance with claim 2 wherein said colorant is a pigment of carbon black, cyan, magenta, yellow, or mixtures thereof.

17. A process in accordance with claim 2 with an ink latency of from about 20 to about 60 seconds; a smear ratio value of from about 0 to about 0.06, and an optical density for the images developed with said ink of from about 1.2 to about 1.6.

18. A process in accordance with claim 2 wherein said ink further contains biocides and humectants.

19. A process in accordance with claim 18 wherein the biocides and humectants are each present in an amount of from about 0.01 to about 50 weight percent.

* * * * *